(12) United States Patent
Jenkins et al.

(10) Patent No.: US 8,610,542 B2
(45) Date of Patent: Dec. 17, 2013

(54) RADIO FREQUENCY IDENTIFICATION READER WITH VARIABLE RANGE

(75) Inventors: Ian Jenkins, Stonybrook, NY (US); David Bellows, Wantagh, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 861 days.

(21) Appl. No.: 12/291,290

(22) Filed: Nov. 7, 2008

(65) Prior Publication Data

US 2010/0117798 A1    May 13, 2010

(51) Int. Cl.
  *H04Q 5/22*    (2006.01)
(52) U.S. Cl.
  USPC .... 340/10.1; 340/572.1; 340/505; 340/539.1; 340/539.11; 340/10.3; 340/10.31; 340/10.5; 235/375; 235/376; 235/472.01; 235/472.02
(58) Field of Classification Search
  None
  See application file for complete search history.

(56) References Cited

U.S. PATENT DOCUMENTS

| | | | | |
|---|---|---|---|---|
| 5,132,523 A | * | 7/1992 | Bassett | 235/462.45 |
| 5,790,536 A | * | 8/1998 | Mahany et al. | 370/338 |
| 5,796,091 A | * | 8/1998 | Schmidt et al. | 235/472.01 |
| 6,486,769 B1 | * | 11/2002 | McLean | 340/10.32 |
| 2003/0156032 A1 | * | 8/2003 | Adams et al. | 340/572.7 |
| 2004/0074969 A1 | * | 4/2004 | Knowles et al. | 235/462.31 |
| 2005/0040224 A1 | * | 2/2005 | Brinton et al. | 235/376 |
| 2005/0280539 A1 | * | 12/2005 | Pettus | 340/572.1 |
| 2007/0017997 A1 | * | 1/2007 | Talley et al. | 235/462.43 |
| 2007/0030150 A1 | * | 2/2007 | Mullins | 340/572.1 |
| 2007/0042819 A1 | * | 2/2007 | Li et al. | 455/575.5 |
| 2007/0267490 A1 | * | 11/2007 | Jerabeck et al. | 235/383 |
| 2008/0054075 A1 | * | 3/2008 | Barkan | 235/462.01 |
| 2008/0088415 A1 | * | 4/2008 | Quan | 340/10.3 |
| 2008/0238621 A1 | * | 10/2008 | Rofougaran et al. | 340/10.1 |
| 2008/0296388 A1 | * | 12/2008 | Drzymala et al. | 235/462.42 |
| 2009/0254438 A1 | * | 10/2009 | Johnson et al. | 705/17 |
| 2010/0045439 A1 | * | 2/2010 | Tak et al. | 340/10.1 |
| 2010/0234099 A1 | * | 9/2010 | Rasmussen et al. | 463/29 |

* cited by examiner

*Primary Examiner* — Benjamin C Lee
*Assistant Examiner* — Curtis King

(57) ABSTRACT

A radio frequency identification (RFID) reader for, and method of, reading an RFID tag to obtain data in both hand-held and hands-free modes of operation, include all RFID module supported by the reader and including an antenna for propagating an electromagnetic field over a range, and a controller for varying the range of the antenna to be different in each mode. The antenna has a full range, preferably by default, in the handheld mode, and the controller is operative, preferably automatically, for decreasing the full range to a restricted range in the hands-free mode.

2 Claims, 3 Drawing Sheets

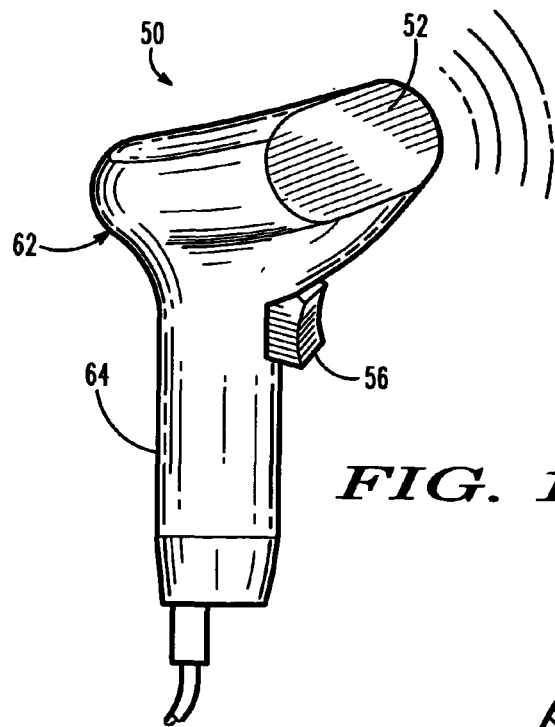
*FIG. 1*
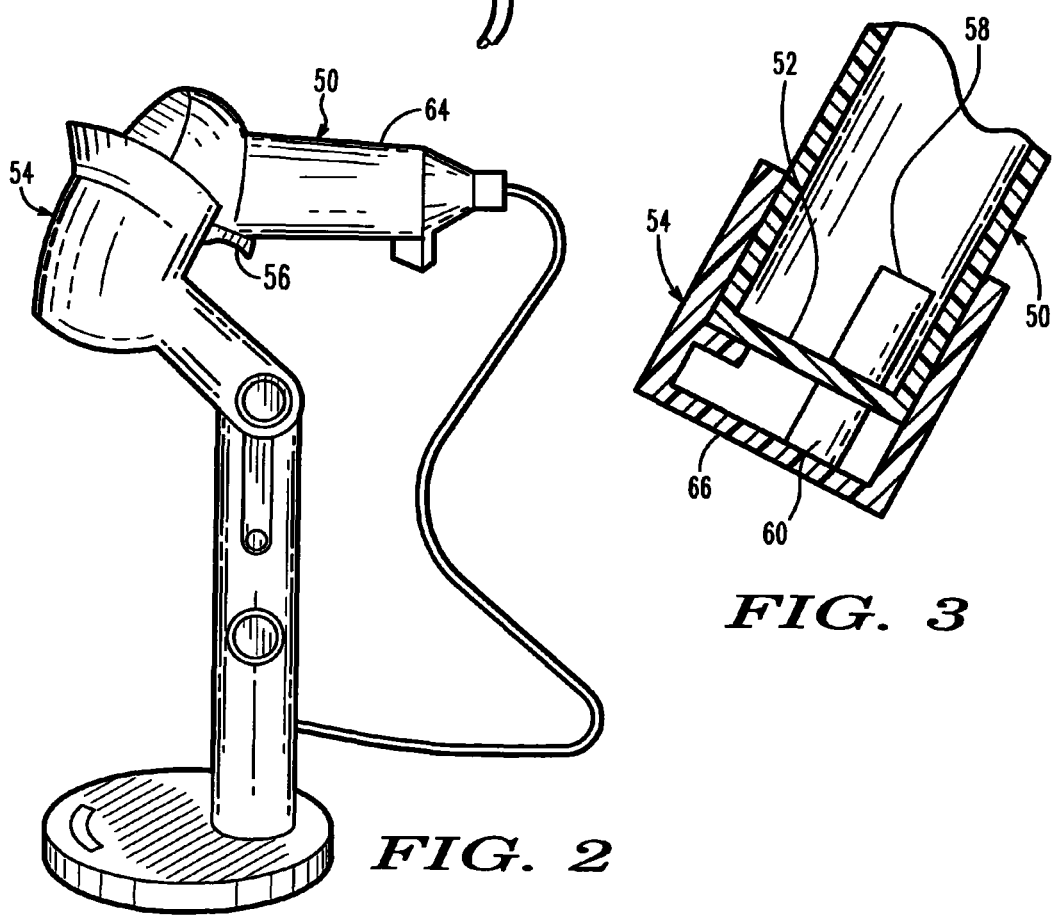
*FIG. 2*
*FIG. 3*

RADIO FREQUENCY IDENTIFICATION READER WITH VARIABLE RANGE

DESCRIPTION OF THE RELATED ART

Radio frequency identification (RFID) is known in the field of (automatic data capture. A transponder, known generally as a tag, is attached to an object and communicates wirelessly with an RFID reader. RFID technology is used in a variety of applications including retail, industrial, transportation, tracking, security, animal identification and individual identification. Transfer of data via RFID technology may be used, for example, for indicating the presence of the object, such as in electronic article surveillance (EAS), for obtaining data associated with the object, or for identifying the object. In an automatic identification system, the tag is typically programmed with unique information, such as encoded data including an identifying code. The RFID reader includes an antenna which emits radio carrier signals over a field of view or range to activate the tag and read data from it, and a microprocessor including a decoder for decoding the data read. The tag responds to the signal by modulating the carrier signal in accordance with the encoded data.

RFID technology allows for non-contact reading of either a single tag, or multiple tags, at the same time. The RFID reader may be a mobile reader, such as a handheld reader, or a stationary hands-free reader such as a reader fixedly located in a tunnel, a door portal or a toll booth, or resting on a countertop or on a support, such as a stand or a holster. The electromagnetic field generated by the antenna may be constant or activated by all actuator such as a sensor or a trigger. Advantages to RFID technology include non-contact reading without the need for line-of-sight interrogation.

In use of the RFID reader, an operator may either, in a hands-free mode, present a single tag on the object to a stationary RFID reader, and hold the object at least momentarily steady in a "presentation" mode, or, in a handheld mode, may bring or aim a handheld RFID reader to or at one or more tags on one or more objects. The choice depends on operator preference, the size and/or weight and/or bulkiness of the object, or on the layout of a workstation or environment in which the RFID reader is used.

Although the known RFID reader is generally satisfactory for its intended purpose, one concern relates to the range or extent of the field of view of the antenna in which each tag can be read. For the handheld mode to be effective, the antenna range is typically designed to be long, for instance, many feet from the RFID reader. A long antenna range enables the operator to read one or more tags on one or more objects that are either far from the handheld RFID reader, for instance, on a remote shelf, or are either too big, or too heavy, or too inconvenient to be brought to the handheld RFID reader.

However, if such an RFID reader with a long antenna range is placed on a countertop or on a support for hands-free operation, preferably for reading a single tag, then the RFID reader can unintentionally read other tags on other objects that just happen to be in the long antenna range. For example, it is not uncommon for a consumer to simultaneously dump many objects to be purchased on a countertop in a retail point-of-sale environment, in which event, the RFID reader will at least try to read the tags on all those objects scattered around the countertop. Worse yet, the operator will not know which of the tags have been read. Essentially, the operator does not know whether more than one object tag is within the field of view of the RFID antenna and, if so, which one or more of the object tags was read. A primary complaint of RFID reader operators is that they are working "blind" and do not know what tag was read. It would be desirable to limit the long antenna range in such an RFID reader in the hands-free, single tag reading, mode of operation.

SUMMARY OF THE INVENTION

One feature of the present invention resides, briefly stated, in a radio frequency identification (RFID) reader for, and a method of, reading an RFID tag to obtain data. The reader could be configured in a hands-free and/or a handheld mode of operation. The reader advantageously includes a housing having a handle for the handheld mode. Also, the housing is preferably configured with a gun-shaped configuration, and a manually actuatable trigger is provided on the housing at a location underlying an operator's forefinger when the operator holds the handle in the operator's hand. The housing could have other configurations, such as a parallelepiped, box-like shape, or a cylindrical, flashlight-like shape. The reader may also have a support, such as an upright stand, for supporting the housing on a support surface, such as a countertop, for the hands-free mode. The support could also be a holster that is worn by the operator, preferably on a belt at waist level.

In accordance with a preferred embodiment, the RFID reader includes an RFID module supported by the housing. The RFID module is operative for reading an RFID tag or transponder to obtain data in both modes. The RFID module includes an antenna which emits radio frequency carrier signals to activate the tag and read the data from it, and a controller including a decoder for decoding the data read. The tag responds to the signal by modulating the carrier signal in accordance with the encoded data. The RFID antenna is operative for propagating an electromagnetic field over a range or field of view.

In accordance with this invention, a microprocessor or controller, preferably the same controller operative for decoding the data, is also operative for varying the range of the antenna to be different in each mode. The antenna has a full range, e.g., fifty feet away from the reader, in the handheld mode, and the controller is operative for decreasing the full range to a restricted range, e.g., six inches away from the reader, in the hands-free mode. The controller includes a control in the support and/or the housing, for detecting the presence of the housing on the support to indicate the hands-free mode to the controller, and the absence of the housing on the support to indicate the handheld mode to the controller.

In one embodiment, the control includes a magnetic sensor, such as a reed switch or a Hall effect sensor, in the support and/or the housing. In another embodiment, the control includes a mechanical switch in the support and/or the housing. In still another embodiment, the control includes a field attenuation portion of the support, for reducing a strength of the electromagnetic field propagated by the antenna when the housing is on the support. The range can also be changed by sending a command from a remote host computer to the controller via a wired or wireless link, or by reading a special purpose tag that enables the controller to reconfigure the reader.

Thus, the range of the RFID antenna is, in contrast to the prior art, restricted by the controller in response to the control indicating the hands-free mode. If the RFID reader is placed on the support in a cramped space, then the range is advantageously reduced to prevent tags on nearby objects that are not to be transacted from being accidentally read. If the RFID reader is picked up from the support to read a tag on an object that, for example, cannot be easily brought to the reader, then the range is advantageously increased, preferably to the default full range, to read one or more tags on one or more remote objects, and is advantageously decreased to the restricted range when the reader is returned to the support. The restricted range is advantageously automatically configured by the controller when the reader is mounted on the support.

In the case of the hands-free reader, the tag is swiped past, or presented to, the reader in its immediate vicinity, and the operator now knows whether he or she is holding the RFID tag within the field of view of the RFID antenna. In the handheld mode tile operator now knows whether more than one RFID tag is within the field of view of the RFID antenna and, if so, which one of the RFID tags was read. In the preferred embodiment, the reader may be used for tracking inventory or shipments.

Another aspect of the invention still further resides in a radio frequency identification (RFID) method of reading an RFID tag to obtain data in both handheld and hands-free modes of operation, performed by propagating an electromagnetic field of all antenna over a range, and varying the range of the antenna to be different in each mode. Advantageously, the electromagnetic field is propagated with a full range in the handheld mode, and the full range is decreased, preferably automatically, to a restricted range in the hands-free mode.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of one embodiment of an RFID reader operative in a handheld mode for reading tags in accordance with this invention;

FIG. 2 is a perspective view of the RFID reader of FIG. 1 operative in a hands-free mode for reading tags in accordance with this invention;

FIG. 3 is a broken-away sectional view of a detail of the embodiment of FIG. 2;

DETAILED DESCRIPTION OF THE PREFERRED EMBODIMENTS

Figure 4:
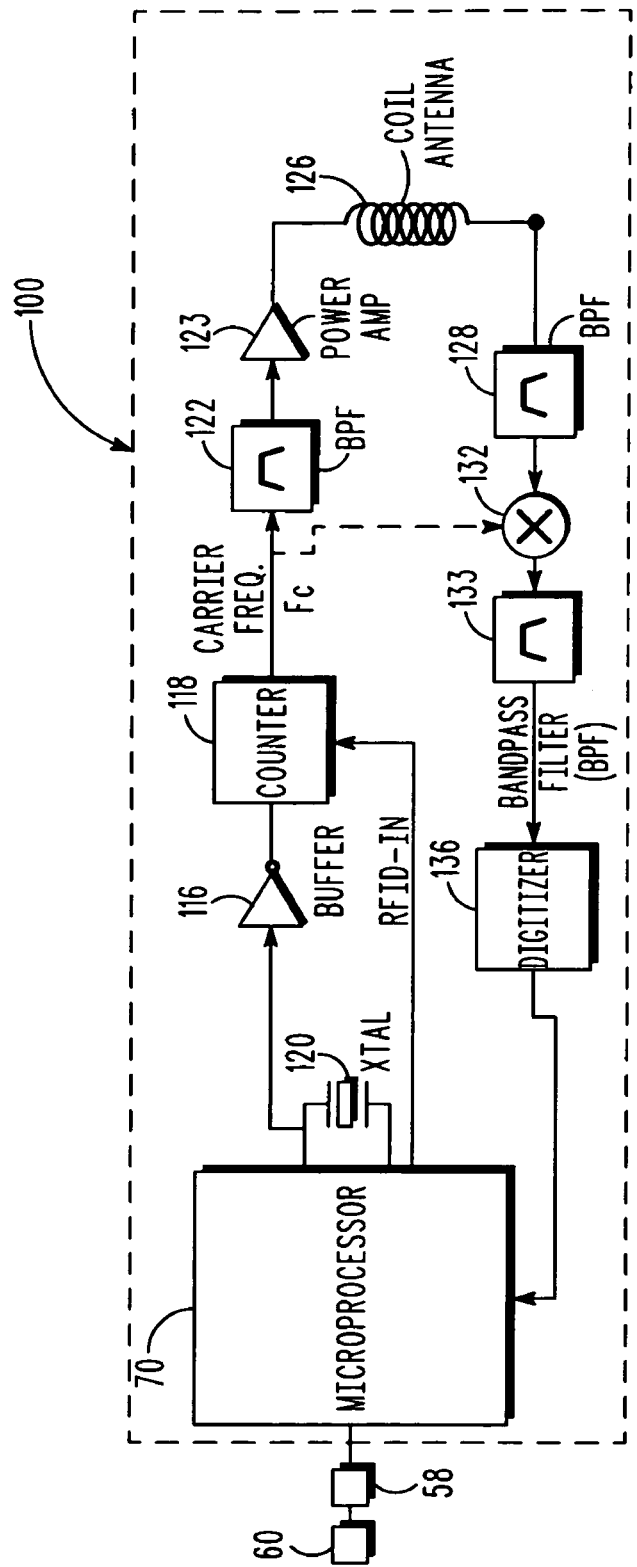
FIG. 4 is a circuit schematic depicting an RFID module in the RFID reader of FIGS. 1-3.

Reference numeral 50 in FIGS. 1-2 generally identifies one embodiment of an RFID data capture reader having a gun-shaped housing 62 with a handle 64, a trigger 56 and a front wall 52. In a handheld mode of operation as depicted in FIG. 1, the housing 62 can be picked up by an operator, held in the operator's hand, aimed at one or more RFID tags or transponders on one or more objects, and then the trigger 56 can be manually depressed to initiate tag reading. In some applications, the trigger can be omitted, in which case, the reading is continuously or periodically performed.

Alternatively, in a hands-free mode of operation as depicted in FIG. 2, the housing 62 can be placed in, and supported by, a support such as a cradle or stand 54 supported on a countertop or like support surface. The stand 54 preferably deactivates the trigger 56, and the reading is continuously or periodically performed. The reader 50 can thus be used as a stationary hands-free workstation in which tag-bearing objects are successively slid or swiped past, or presented to, the front wall 52, or can be picked up off the stand 54 and held and operated in the operator's hand in the handheld mode.

The reader 50 has an RFID module 100 supported in the housing 62. As shown in FIG. 4, the RFID module or circuit 100 includes a crystal clock (XTAL) 120 that provides a clock signal to a microprocessor or controller 70. A buffer amplifier 116 amplifies and processes the clock signal from clock 120 and provides a signal to a counter 118. The controller 70 also provides an RFID enable (RFID-EN) signal to the counter 118 which enables the RFID circuit. Thereafter, the counter output signal at a carrier frequency (Fc) is filtered by a bandpass filter (BPF) 122, amplified by a power amplifier 123, and then propagated as an electromagnetic radio frequency (RF) field via an antenna 126. Antenna 126 then determines, either through inductive coupling, through RF propagation, or other suitable RF method, whether there is an RFID tag or transponder in the RF field of view or range propagated by the antenna 126, and, if so, the characteristics of the interrogated RFID tag. The antenna need not necessarily be a coil, as illustrated. The strength or extent of the range of the antenna 126 is controlled by the controller 70.

In operation, the antenna 126 transmits a data signal based on the RF information to a bandpass filter 128 that then transmits the signal to a multiplier 132. The multiplier 132 samples the signal at a frequency rate controlled by the counter 118 and then transmits the sampled signal to another bandpass filter 133 which pre-processes the data signal and transmits it to a digitizer 136, after which it preferably is transmitted as a suitable digital signal to the controller 70 that processes and decodes the digitized signal from the digitizer 136 into data descriptive of the tag.

As previously discussed, the range or field of view of the RFID antenna 126 is typically configured by the controller 70 to be long, for instance, many feet from the RFID reader 50. A long antenna range, e.g., fifty feet away from the front wall 52 of the reader, enables the operator to read one or more tags located on one or more objects that are either far from the handheld RFID reader, for instance, on a remote shelf, or are either too big, or too heavy, or too inconvenient to be brought to the handheld RFID reader. However, if the RFID reader 50 with the long antenna range is placed on the support stand 54 for hands-free, single tag reading, operation, then the RFID reader 50 can unintentionally read other tags on other objects that just happen to be in the long antenna range. For example, if many objects to be purchased are scattered around on a countertop in a retail point-of-sale environment, then the RFID reader 50 will at least try to read the tags on all those objects. As previously noted, the operator typically does not know whether one or more of the object tags was read, because he or she is working "blind" and does not know which tag was read.

Hence, in accordance with one aspect of this invention, the long antenna range in the RFID reader 50 is reduced in the hands-free mode of operation. The controller or programmed microprocessor 70, preferably the same one that processes and decodes the digitized signal from the digitizer 136, is operative for varying the range of the antenna 126 to be different in each mode. The antenna 126 has the full long range described above, preferably by default, in the handheld mode, and the controller 70 is operative for decreasing the full range to a restricted range, e.g., six inches away from the front wall 52 of the reader, in the hands-free mode. The controller 70 includes controls 58, 60 (see FIG. 3) on the support 54 and/or the housing 62 for detecting the presence of the housing 62 on the support 54 to indicate the hands-free mode to the controller 70, and the absence of the housing 62 on the support 54 to indicate the handheld mode to the controller 70.

In one embodiment, the controls 58, 60 include a magnetic sensor, such as a reed switch or a Hall effect sensor, in the support 54 and/or the housing 62. When the Support 54 and the housing 62 are brought into proximity with each other, the controls 58, 60 electromagnetically interact, and signal the controller 70, as shown in FIG. 4. In another embodiment, the controls 58, 60 include a mechanical switch in the support 54 and/or the housing 62. When the support 54 and the housing 62 are brought into proximity with each other, the mechanical switch is actuated, and the controller 70 is signaled. Optical sensors could also be used. In still another embodiment, a field attenuation portion or wall 66 of the stand 54 serves to reduce a strength of the electromagnetic field propagated by the antenna 126 when the housing 62 is mounted on the support 54. The range can also be changed by sending a command from a remote host computer to the controller 70 via a wired or wireless link, or by reading a special purpose tag that causes the controller 70 to reconfigure the reader 50.

Thus, the range of the RFID antenna 126 is, in contrast to the prior art, restricted by the controller 70 in response to the controls 58, 60 indicating the hands-free mode. The restricted range is advantageously automatically configured by the controller 70 when the reader 50 is mounted on the support 54.

Figure 5:
FIG. 5 is a perspective view of another embodiment of a handheld RFID reader operative in a handheld mode for reading tags in accordance with this invention.
Figure 6:
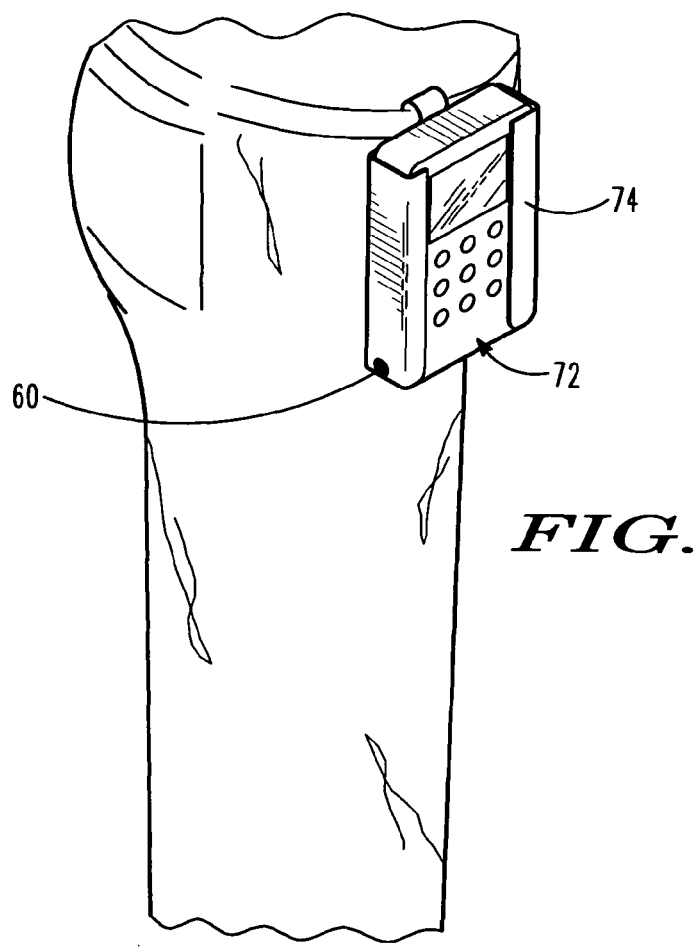
FIG. 6 is a perspective view of the RFID reader of FIG. 5 in a hands-free mode.

As previously noted, the housing 62 could have other configurations, such as a parallelepiped box 72, as depicted in FIG. 5. The support could have other configurations than the upright stand 54. For example, as shown in FIG. 6, the support could also be a holster 74 that is worn by the operator, preferably on a belt at waist level. The restricted range of the antenna 126 in the hands-free mode could also be reduced to zero. In other words, the antenna 126 may, in the FIG. 6 embodiment, propagate no RF field when the housing 62 is mounted in the holster 74, thereby turning the RFID reader off. As before, the control 60 on the holster 74 signals the controller 70 when the embodiment of FIG. 6 is in the hands-free mode.

It will be understood that each of the elements described above, or two or more together, also may find a useful application in other types of constructions differing from the types described above While the invention has been illustrated and described as an arrangement for, and a method of, restricting the field of view of an RFID reader in the hands-free mode, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A radio frequency identification (RFID) reader for reading an RFID tag to obtain data in both handheld and hands-free modes of operation, comprising:
   an RFID module supported by the reader in a housing and including an antenna for
   propagating an electromagnetic field;
   a support for supporting the housing in the hands-free mode; and
   a field attenuation wall of the support operable for reducing a strength of the electromagnetic field propagated by the antenna when the housing is on the support, wherein the antenna propagates the electromagnetic field over a full range in the handheld mode, and the antenna propagates the electromagnetic field in a decreased restricted range through the field attenuation wall in the hands-free mode on the support; and
   wherein the support triggers the reader to perform reading periodically.

2. A radio frequency identification (RFID) method of reading an RFID tag to obtain data in both handheld and hands-free modes of operation, comprising the steps of:
   providing an antenna of an RFID reader in a housing; supporting the housing in a stand in the hands-free mode; propagating an electromagnetic field of an antenna; and
   attenuating the electromagnetic field propagated by the antenna by a field attenuation wall of the stand when the housing is on the stand, wherein the electromagnetic field has a full range in the handheld mode, and wherein the electromagnetic field has a decreased restricted range through the field attenuation wall in the hands-free mode on the stand; and
   wherein the supporting step also triggers the reader to perform reading periodically.

* * * * *